(No Model.) 2 Sheets—Sheet 1.

E. H. JENKINS.
CULTIVATOR.

No. 472,361. Patented Apr. 5, 1892.

Witnesses
C. M. Gallaher
W. S. Duvall

Inventor
Edw'd H. Jenkins
By his Attorneys,
C. A. Snow & Co.

(No Model.) 2 Sheets—Sheet 2.

E. H. JENKINS.
CULTIVATOR.

No. 472,361. Patented Apr. 5, 1892.

Witnesses
E. M. Gallaher
W. S. Duvall

Inventor
Edw'd H. Jenkins
By his Attorneys,
C. A. Snow & Co.

THE NORRIS PETERS CO., PHOTO-LITHO., WASHINGTON, D. C.

UNITED STATES PATENT OFFICE.

EDWARD H. JENKINS, OF KALAMAZOO, NEBRASKA.

CULTIVATOR.

SPECIFICATION forming part of Letters Patent No. 472,361, dated April 5, 1892.

Application filed February 25, 1891. Serial No. 382,842. (No model.)

*To all whom it may concern:*

Be it known that I, EDWARD H. JENKINS, a citizen of the United States, residing at Kalamazoo, in the county of Madison and State of Nebraska, have invented a new and useful Cultivator for Listed Corn, of which the following is a specification.

This invention relates to improvements in cultivators for listed corn; and my objects are to construct a cultivator that will cultivate two rows of corn at the same time with ordinary cultivator-shovels and to accomplish the same by means of an improved adjustable connection of cheap and simple construction between the cultivator-beams and the axle which will be adjustable to the width between the rows.

Other objects and advantages of the invention will appear in the following description, and the novel features thereof will be particularly pointed out in the claims.

Figure 1:
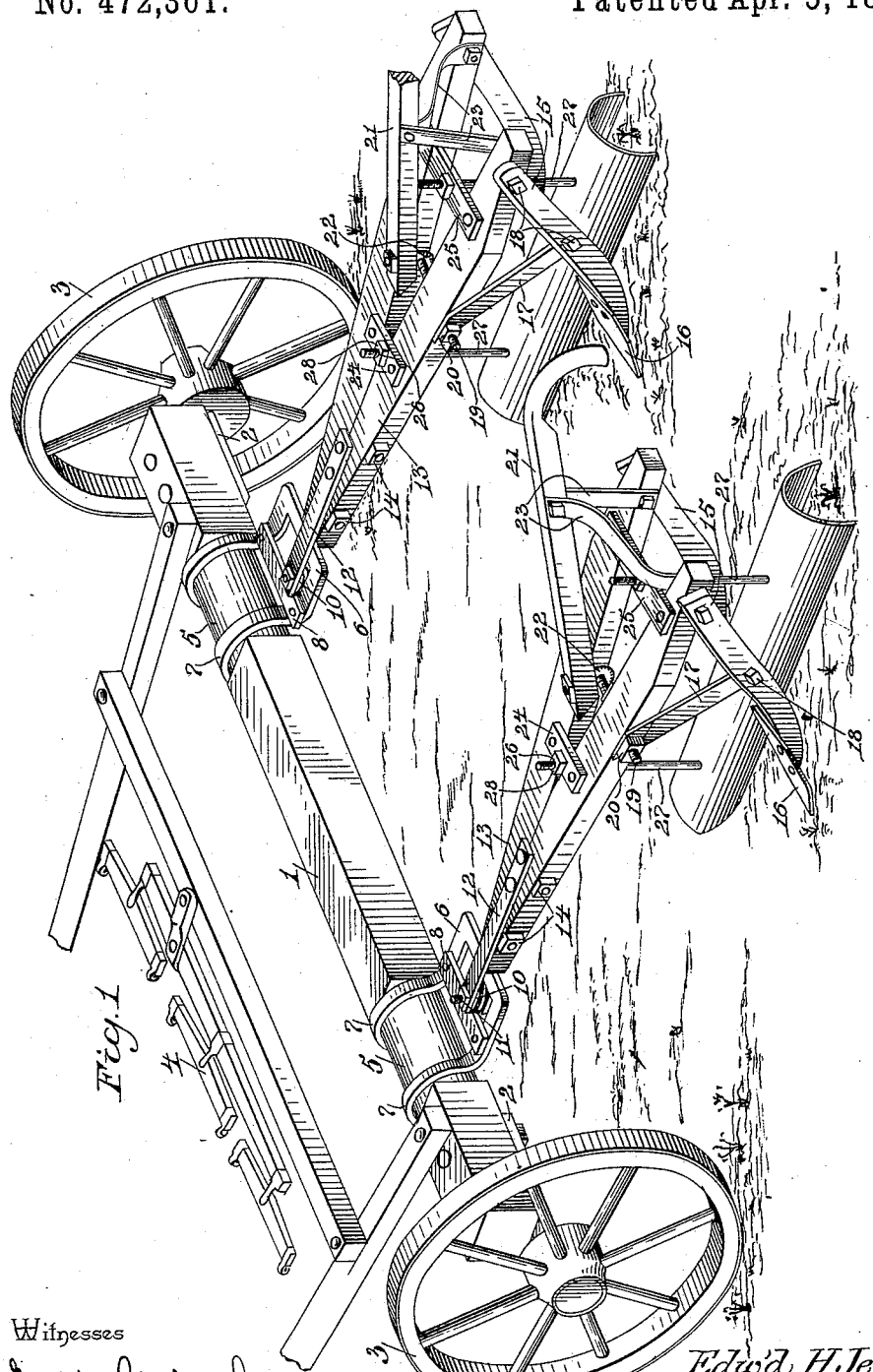
Figure 2:
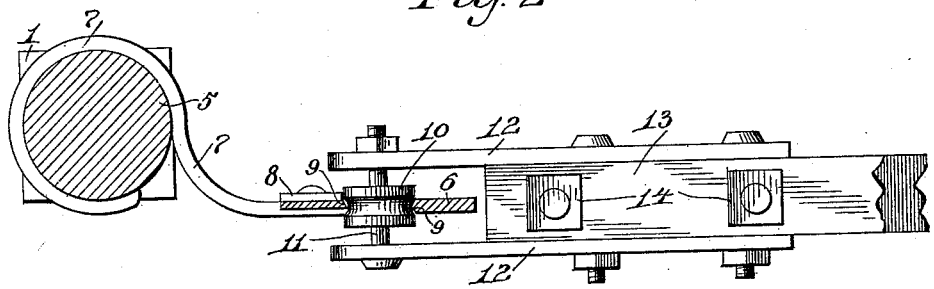
Figure 3:
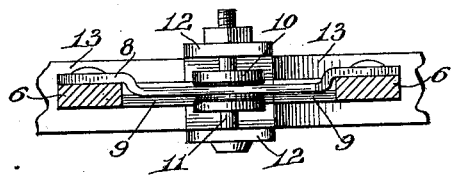

Referring to the drawings, Figure 1 is a perspective of a cultivator embodying my improvements. Fig. 2 is a longitudinal section through the connection between the cultivator-beams. Fig. 3 is a transverse section through said connection.

Like numerals of reference indicate like parts in all the figures of the drawings.

In practicing my invention I employ an axle 1, which terminates at its ends in suitable bearings 2 for the ground-wheels 3. To the axle is connected an ordinary draft-evener 4. At each side of the center the axle is provided with reduced cylindrical bearing portions 5, in each of which are loosely journaled the front terminals of a U-shaped bail 6, said terminals being bent at their extremities around the reduced portions of the axle to form eyes 7 for thus embracing the axle. The bails are each traversed by a cross-bar 8, the rear edge of which and the front edge of the rear end of the bail are rounded or beveled, as at 9, the ends of said bar being securely bolted or otherwise connected to the terminals of the bail. Between the cross-bar and the end of each bail there is mounted for movement a grooved roller 10, through which passes a vertical bearing-axle 11, which extends above and below the bail and receives at its ends the front ends of a pair of straps 12. The draft-straps 12 extend rearwardly and embrace the upper and lower sides of a pair of diverging cultivator-beams 13, the front ends of which are securely bolted in position by bolts 14.

From the rear ends of the beams 13 depend standards 15, terminating in shovels 16, said standards being braced by diagonal braces 17, bolted, as at 18, to the standards and connected by a transverse adjusting-rod 19 passing through the beams. The adjusting-rod 19 is screw-threaded and provided at opposite sides of each beam with a nut or cap 20. A handle 21 is connected at its front end by a U-bolt 22 to each of the adjusting-rods 19 and is braced by opposite inclined braces 23, bolted to the opposite sides of the handles and at their lower ends to the rear extremities of the beams.

It will be apparent that by manipulating the nuts 20 and previously slightly loosening the nuts 14 the two beams may be readily adjusted a proper width apart, and after such adjustment the nuts 14 and 19 are turned to snugly embrace the sides of the beam.

Cross-bars 24 and 25, located at the front and rear ends of the beams, are provided at their centers with openings 26, through which pass depending loose rods 27, one, therefore, being located near the front and the other at the rear of each pair of beams. These rods are preferably threaded at their upper ends and are provided with caps or adjusting-nuts 28, by which they may be lengthened or shortened. The rods also loosely fit the openings and are free to vertically reciprocate in the same. At their lower ends each pair of rods is connected to the front and rear ends of a fender of ordinary shape.

In operation it will be apparent that whatever irregularities and unevenness are present in the furrows will cause the front ends of the beams, and consequently their rear ends, to be diverted in accordance therewith, the small rollers readily traveling back and forth between the rear ends of the bails and the cross-bars thereof, and thus the cultivating-shovels are always maintained in a proper position with relation to the furrows. It will also be apparent that by the employment of the suspension-rods in connection with the fenders said fenders when meeting with obstructions during their travel along the furrows will readily ride over the same, and when thus elevated the rods reciprocate back and forth through the openings in the cross-bars, and the progress of the cultivator by reason of such obstruction is not stopped or in any way impeded and danger of breakage of parts or a deflection out of the furrow of the shovels is avoided.

Having described my invention, what I claim is—

1. In a cultivator of the class described, the combination, with the axle terminating at its ends in bearings, having wheels, and between its ends reduced to form cylindrical portions, of U-shaped bails terminating in eyes loosely mounted in each of the cylindrical portions, a pair of diverging cultivator-beams secured together and located in rear of each bail, a cross-bar connecting the terminals of each bail, grooved rollers mounted between the cross-bars and the ends of the bails, and pairs of rigid straps bolted to the front ends of the diverging beams and having bearing-openings receiving the ends of the axles of the rollers, substantially as specified.

2. The combination, with a pair of cultivator-beams terminating in standards and perforated cross-bars connecting said beams, of rods loosely mounted for vertical reciprocation in the perforations, terminating at their upper ends in nuts threaded thereon, whereby said rods are vertically adjustable, and a fender connected at its ends to the lower ends of the rods, substantially as specified.

In testimony that I claim the foregoing as my own I have hereto affixed my signature in presence of two witnesses.

EDWARD H. JENKINS.

Witnesses:
J. A. SAUL,
J. W. SIGGERS.